US008075845B2

(12) United States Patent
Gülener

(10) Patent No.: US 8,075,845 B2
(45) Date of Patent: Dec. 13, 2011

(54) HEAT-EXCHANGER REACTOR HAVING MIXING ZONES

(75) Inventor: Selim Gülener, Friesenhem (DE)

(73) Assignee: Alfa Laval Corporate AB, Lund (SE)

( * ) Notice: Subject to any disclaimer, the term of this patent is extended or adjusted under 35 U.S.C. 154(b) by 229 days.

(21) Appl. No.: 12/441,914

(22) PCT Filed: Oct. 3, 2007

(86) PCT No.: PCT/SE2007/000879
§ 371 (c)(1),
(2), (4) Date: May 20, 2009

(87) PCT Pub. No.: WO2008/041910
PCT Pub. Date: Apr. 10, 2008

(65) Prior Publication Data

US 2010/0008833 A1 Jan. 14, 2010

(30) Foreign Application Priority Data

Oct. 3, 2006 (SE) ...................................... 0602092

(51) Int. Cl.
*B01J 19/00* (2006.01)
*B01J 8/00* (2006.01)

(52) U.S. Cl. ........ 422/198; 422/200; 422/201; 422/601; 422/602; 422/604; 165/164; 165/165

(58) Field of Classification Search .................. 422/601, 422/602, 604, 198, 200, 201; 165/164, DIG. 398, 165/DIG. 399, 165; 149/109.6
See application file for complete search history.

(56) References Cited

U.S. PATENT DOCUMENTS 5,346,564 A * 9/1994 Vance et al. ............... 149/109.6
6,818,189 B1 * 11/2004 Adris et al. ................... 422/653
2002/0131928 A1 9/2002 Keller et al.

FOREIGN PATENT DOCUMENTS

WO 9954274 A1 10/1999
WO 2005123635 A1 12/2005

OTHER PUBLICATIONS

PCT International Search Report; Int. App. No. PCT/SE2007/000879; Int. Filing Date Mar. 10, 2007.

* cited by examiner

*Primary Examiner* — Walter Griffin
*Assistant Examiner* — Huy-Tram Nguyen
(74) *Attorney, Agent, or Firm* — Michaud-Kinney Group LLP

(57) ABSTRACT

The present invention relates to a heat-exchanger reactor comprising a vessel, at least one dividing member selected from plates, walls, or spiral sheets, which dividing member separates heat exchanging fluids into at least one heat exchanging zone from fluids into at least one mixing zone, and at least one flow-directing device having one or more ports or one or more injection ports, which flow-directing device is inserted into the mixing zone. The present invention relates also to uses of the heat-exchanger reactor.

17 Claims, 2 Drawing Sheets

HEAT-EXCHANGER REACTOR HAVING MIXING ZONES

FIELD OF THE INVENTION

The present invention relates to a heat-exchanger reactor having mixing zones, and a use of the heat-exchanger reactor according to the invention.

BACKGROUND OF THE INVENTION

In many processes the reactants or the fluids are mixed before entering a heat-exchanging zone and the mixture is then brought to the desired temperature in the heat-exchanging zone. In some processes the heat is transferred from the flow of fluids by heat exchangers connected in series and before each heat exchanger one or more reactants or fluids are added in batch wise portions. According to another practice the reaction flow is circulated in order to restrict any temperature rise. A further solution, which is used, is to connect one or more mixing vessels in series in a so-called cascade of mixing vessels.

All of the above-mentioned solutions have drawbacks because, among other things, they are complicated and expensive.

SUMMARY OF THE INVENTION

The present invention relates to a heat-exchanger reactor having mixing zones, comprising a vessel, at least one dividing member selected from plates, walls, or spiral sheets, which dividing member separates heat exchanging fluids into at least one heat exchanging zone from fluids into at least one mixing zone, and at least one flow-directing device having one or more ports or perforations for fluids, which flow-directing device is inserted into the mixing zone, and the heat to or from the mixing zone being influenced by the heat to or from the heat exchanging zone.

The heat-exchanger reactor having mixing zones can be a reaction-mixing cooler (RMC), a heat-exchanger in which the mixing of fluids takes place in one or more mixing zones, a heat-exchanger having mixing zones in which chemical reactions take place, a heat-exchanger having mixing zones in which dilution of fluids take place, etc., or combinations of these.

The heat-exchanger reactor comprises a vessel, which is divided into at least one zone for heat-exchanging fluids and at least one mixing zone for fluids to be mixed, for fluids to be reacted, for fluids to be diluted etc. the heat-exchanger reactor comprises further at least one dividing member selected from plates, walls, or spiral sheets, which dividing member separates heat exchanging fluids from the fluids in the mixing zones. The heat to and from the mixing zones is heat-exchanged to the heat-exchanging fluids in the heat-exchanging zone or zones. The flow-directing devices may be tubes, pipes, conduits, chambers, fluid sheet chambers, or combinations of these, which flow-directing devices have one or more nozzles or jet nozzles, have one or more sprayers, have one or more sprinklers, have one or more ports or perforations for fluids, etc., or combinations of these. The flow-directing devices are inserted into the mixing zone or zones, and the heat to or from the mixing zone being direct effectuate to or from the heat exchanging zone The whole flow-directing device may be pressurized so that the pressure of the fluids inside the flow-directing device are higher than in the fluids of the mixing zones according to one alternative of the invention. According to another alternative there may be no or a little pressure difference between the fluids of the flow-directing device and the fluids of the mixing zone. According to this invention fluids define liquids, gases, fine particles, and combination thereof. Thus, may the fluids be any type of fluids or combinations of fluids, such as liquid-liquid, liquid-gas, or gas-gas etc. The mixing of the fluids may be carried out by the aid of static mixers or any type of mixing elements in the mixing zone in order to increase turbulence according to one alternative of the invention. Another way of mixing the fluids could be to inject one fluid into another in the mixing zone.

As mentioned the mixing of fluids or reactants is effectuated in the heat exchanger. The heat from the exothermic reaction is immediately transferred from the reaction by conductivity. The control of a process will depending on quantity of ports, points, perforations, injection ports etc. of the flow-directing devices, the number of mixing zones etc., and the process will be balanced by a pre-designed temperature range, pressure range etc. calculated based on the kinetics and the reaction in question. The heat-exchanging zone may be a spiral heat exchanger according to one alternative. The spiral heat exchanger can be designed to create a desired turbulence in the flow of fluids without disturbing pressure drop. One advantage of using a spiral heat exchanger is that a standard unit can be used and an arrangement of inlet points or mixing points, which can be nozzles, which are connected to inlet pipes. The arrangement of inlet pipes to which nozzles are connected is one embodiment of the invention. According to another alternative may the heat-exchanging zone be a plate heat exchanger.

The flow-directing device may be one or more tubes or pipes having ports, nozzles, injection ports, sprinkler, sprayers etc. for fluids, one or more fluid sheet chambers having perforations for fluids, or combinations thereof. The tubes of the flow-directing devices may be mounted on a spiral inlet tube according to one alternative. The size as well as the diameter of the ports, the nozzles, the injection ports, the sprinkler, the sprayers etc. may be adjusted depending on application.

To stabilise the arrangements of inlet tubes or pipes in the spiral heat exchanger, distance elements are attached to the pipes between the nozzles. The distance elements will reduce the vibrations of the pipes when the fluids are going through the nozzles, and will also keep the pipes in place when the material is expanding with temperature.

The nozzles can be of any suitable type, they may be jet nozzles, may be finely distributed system with defined holes, with defined slots, or combinations thereof. The nozzles distributed along the inlet pipes may be all of the same kind, thus all the nozzles are identical, according to one alternative embodiment of the invention. According to another alternative different nozzles, ports, injection ports, sprinklers, sprayers etc. may be distributed depending on the position in the unit, i.e. in the mixing zones. According to a further alternative the nozzles may be substantially identical or different in terms of flow rates and design on the pipes, the nozzles may be spaced apart with substantially identical spacing, different spacing etc. on the inlet pipes. Depending on process properties such as the concentration of products, enthalpies, entropies may result in different designs of the unit with variable position in the unit and type of distribution devices.

The present invention also relates to uses of the heat-exchanger reactor according to the invention for chemical reactions, for diluting fluids, for mixing fluids etc.

In the following the invention will be explained by the use of FIGS. 1 to 4. The figures are for the purpose of demonstrating the invention and are not intended to limit its scope.

DETAILED DESCRIPTION OF THE FIGURES

Figure 1:
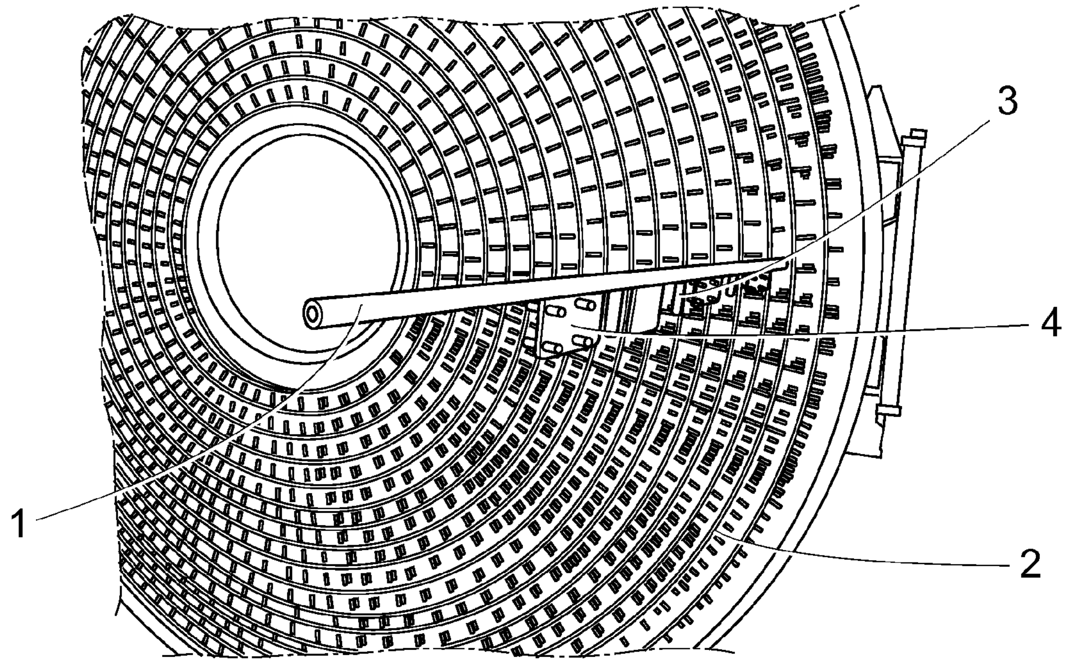
FIG. 1 shows an inlet pipe to be inserted into a spiral heat exchanger according to one example of the invention.
Figure 2:
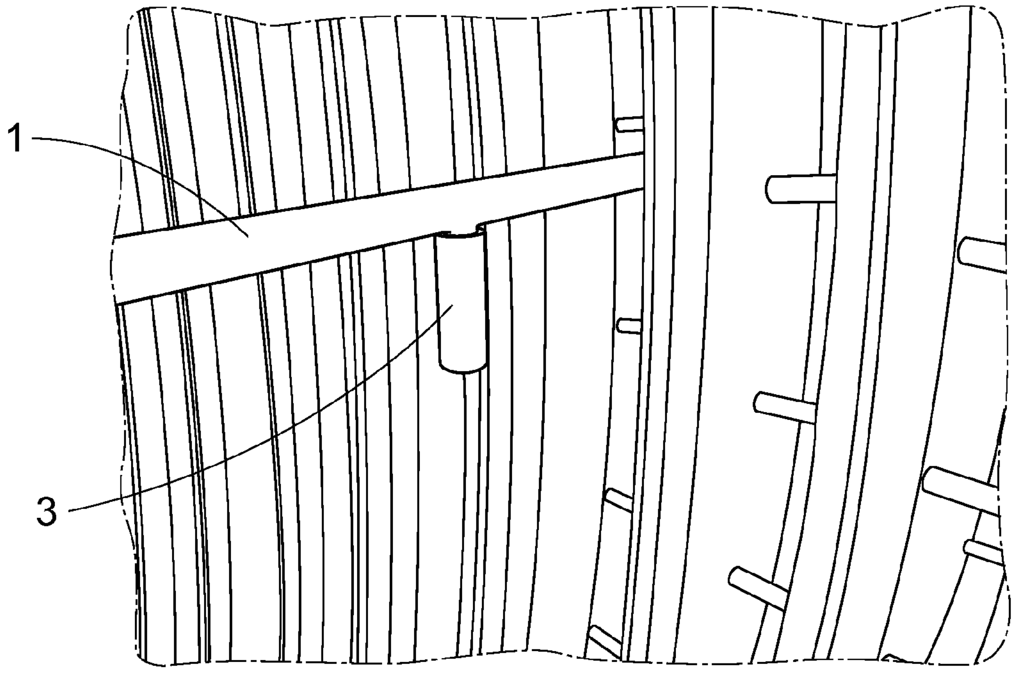
FIG. 2 shows an inlet pipe having a nozzle according to one example of the invention.
Figure 3:
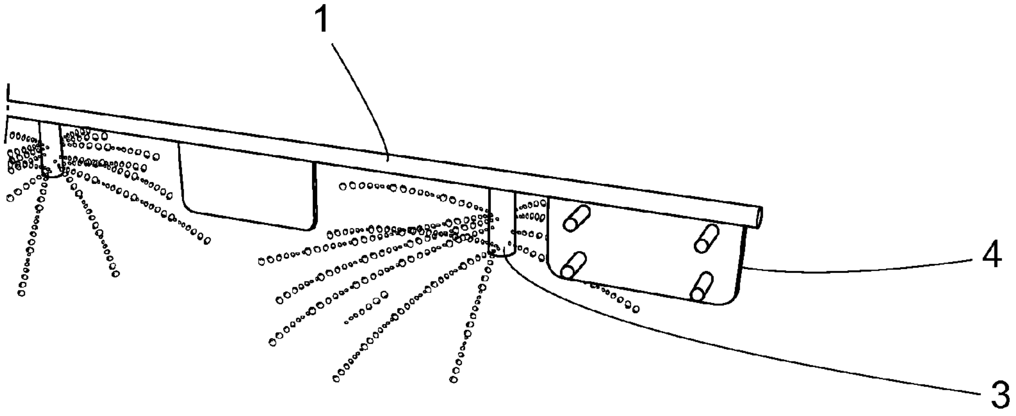
FIG. 3 is an inlet pipe with nozzles, which are spreading fluids in different directions. On the pipes are distant members attached to secure the pipe in the heat exchanger according to one example of the invention.

A pipe or tube 1 is being inserted into a spiral heat exchanger 2 in FIG. 1. On the tube 1 is one or more nozzles 3 placed for inlet of fluids into the mixing zones of the spiral heat exchanger 2. Distance elements 4 are place along tube 1 to secure the tube in the mixing zone. FIG. 2 is a close up view of a tube 1 having a nozzle 3. In FIG. 3 fluids, i.e. water is being sprinkled out from a nozzle 3. The water is sprinkled out in different directions to spread out and to cover the mixing zone in the heat exchanger. FIG. 3 is also showing a distant element 4 in detail. Distant element 4 consists of a planar structure having pegs or pins to secure the element from moving sideways.

Figure 4:
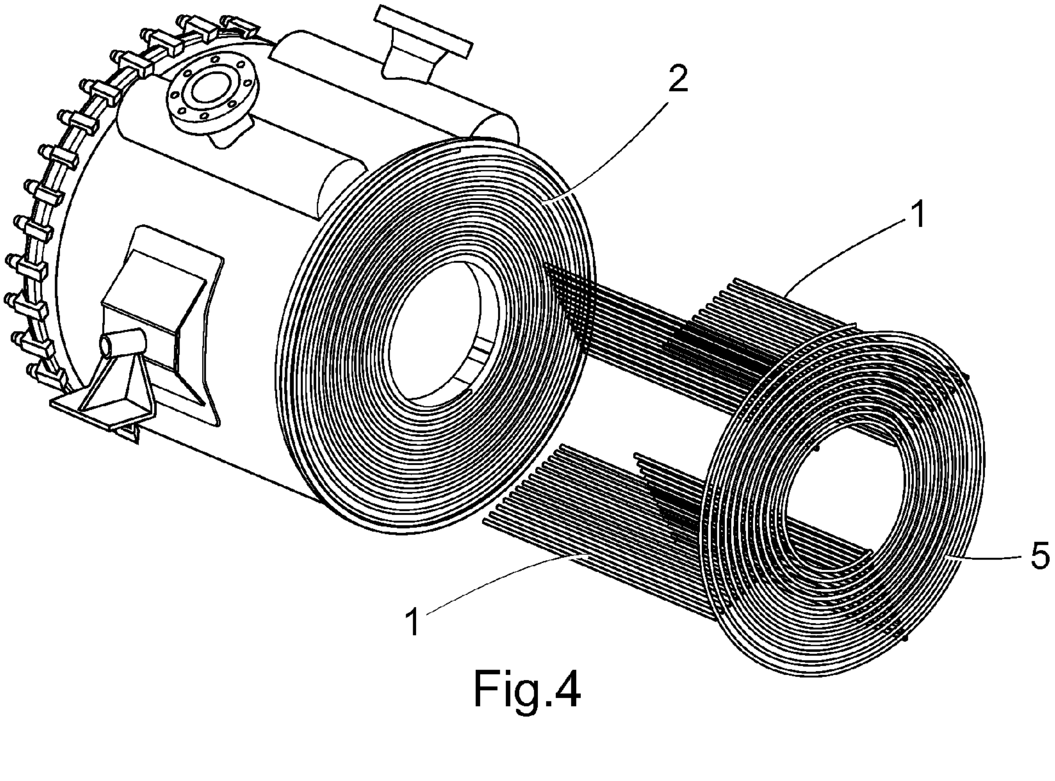
FIG. 4 is an arrangement of inlet pipes connected to a spiral pipe perpendicular to the inlet pipes. The spiral pipe is connecting all the inlet pipes and is also connected to fluid(s) source. The inlet pipe arrangement is inserted into a spiral heat exchanger according to one example of the invention.

In FIG. 4 several tubes 1 are mounted on a spiral inlet tube 5 or spiral inlet pipe 5. This spiral tube 5 is mirroring the spiral of the spiral heat exchanger 2 to facilitate the insertion of the tubes 1 into the heat exchanger 2. Mixing elements, not seen in FIG. 4, may also be inserted into the spiral heat exchanger. The mixing elements may be static mixers.

The heat-exchanger reactor having mixing zones of the invention may for example be used for processes having a process fluid, which could be within the range of 30 to 60 tons, a reaction fluid, which could be within the range of an 0.1 to 4 tons, and the temperature may vary over temperature range 30 to 200° C. The purpose of this Example is to illustrate the performance of the heat-exchanger reactor of the invention, and is not intended to limit the scope of invention.

What is claimed is:

1. A heat-exchanger reactor comprising: a vessel; one or more heat exchanger zones; one or more mixing zones; and at least one dividing member selected from plates, walls, or spiral sheets; which dividing member separates the heat exchanger zones from the mixing zones, and wherein the heat is transferred by conductivity in the dividing member between the mixing zones and the heat exchanger zones; the heat-exchanger reactor further comprises one or more flow-directing devices; wherein the flow-directing devices are at least one of, one or more tubes, one or more pipes, one or more conduits, one or more chambers, and one or more fluid sheet chambers, said flow-directing devices have at least one of one or more fluid ports and one or more injection ports for fluids, and the flow-directing devices being inserted into the one or more mixing zones, wherein the flow-directing device includes one or more tubes having ports for fluids, said tubes being mounted on a spiral inlet tube.

2. The heat-exchanger reactor according to claim 1, wherein the one or more mixing zones comprises one or more static mixers.

3. The heat-exchanger reactor according to claim 1, wherein the flow-directing device includes one or more tubes having ports for fluids, said tubes being mounted on a spiral inlet tube, combined with one or more fluid sheet chambers having perforations for fluids.

4. The chemical reactor according to claim 3, wherein the pipes or the tubes have distance elements.

5. The chemical reactor according claim 3, wherein the ports are nozzles or jet nozzles.

6. The heat-exchanger reactor according to claim 1, wherein one or more ports are selected from the group consisting of one or more nozzles, one or more jet nozzles, one or more sprayers, one or more sprinklers, one or more ports having perforations for fluids, one or more ports having a fine distribution system with at least one of defined holes and defined slots.

7. The heat-exchanger reactor according to claim 1, wherein the heat-exchanging zone is a spiral heat exchanger.

8. The heat-exchanger reactor according to claim 1, wherein the heat-exchanging zone is a plate heat exchanger.

9. The heat-exchanger reactor according to claim 1, wherein the pipes or the tubes have distance elements.

10. The heat-exchanger reactor according to claim 1, wherein the ports are nozzles or jet nozzles.

11. The heat-exchanger reactor according claim 1, wherein all the ports or the injection ports are substantially identical, or to all the ports or injection ports are different ports selected from the group consisting of nozzles, jet nozzles, injection ports, sprinklers, sprayers.

12. The heat-exchanger reactor according to claim 1, wherein the ports or the injection ports are spaced apart with substantially identical spacing therebetween, or different spacing on the inlet pipes.

13. A chemical reactor comprising a vessel, one or more heat exchanger zones, one or more mixing zones, and at least one dividing member selected from plates, walls, or spiral sheets, which dividing member separates the heat exchanger zones from the mixing zones, and wherein the heat is transferred by conductivity in the dividing member between the mixing zones and the heat exchanger zones, the chemical reactor comprises further one or more flow-directing devices, wherein the flow-directing devices being one or more tubes, one or more pipes, one or more conduits, or combinations of these, said flow-directing devices have one or more ports fluids or one or more injection ports for fluids or combinations thereof, and the flow-directing devices being inserted into the one or more mixing zones, and wherein said tubes or said pipes or said conduits being mounted on a spiral inlet tube.

14. The chemical reactor according to claim 13, wherein the heat-exchanging zone is a spiral heat exchanger.

15. The chemical reactor according to claim 13, wherein the pipes or the tubes have distance elements.

16. The chemical reactor according to claim 13, wherein the ports are nozzles or jet nozzles.

17. A chemical reactor comprising a vessel, a heat exchanger zone, one or more mixing zones, and one or more flow-directing devices, said heat-exchanging zone being a spiral heat exchanger, said flow-directing devices being one or more tubes, one or more pipes, one or more conduits, or combinations of these, said flow-directing devices have one or more ports fluids or one or more injection ports for fluids or combinations of these, and the flow-directing devices being inserted into the one or more mixing zones in the spiral heat exchanger, and wherein said tubes or said pipes or said conduits being mounted on a spiral inlet tube.

* * * * *